United States Patent [19]

Suzuki

[11] Patent Number: 4,551,736
[45] Date of Patent: Nov. 5, 1985

[54] INK-JET RECORDING METHOD

[75] Inventor: Eiichi Suzuki, Tokyo, Japan

[73] Assignee: Canon Kabushiki Kaisha, Tokyo, Japan

[21] Appl. No.: 642,268

[22] Filed: Aug. 20, 1984

[30] Foreign Application Priority Data

Sep. 9, 1983 [JP] Japan ................................ 58-165119

[51] Int. Cl.$^4$ ...................... G01D 15/18; C09D 11/00
[52] U.S. Cl. ............................ 346/140 R; 346/140 A; 106/22; 346/140 A
[58] Field of Search ............. 346/1.1, 140 IJ, 140 PD; 106/22

[56] References Cited

U.S. PATENT DOCUMENTS

| | | | |
|---|---|---|---|
| 4,145,182 | 3/1979 | Opitz et al. ........................ | 106/22 X |
| 4,150,997 | 4/1979 | Hayes ................................ | 106/22 X |
| 4,412,225 | 10/1983 | Yoshida et al. ..................... | 346/1.1 |
| 4,422,085 | 12/1983 | Sumitomo et al. ............. | 346/140 IJ |

FOREIGN PATENT DOCUMENTS

| | | | |
|---|---|---|---|
| 8768 | 1/1983 | Japan .................................... | 106/22 |
| 8769 | 1/1983 | Japan .................................... | 106/22 |
| 174465 | 10/1983 | Japan .................................... | 106/22 |

Primary Examiner—George H. Miller, Jr.
Attorney, Agent, or Firm—Fitzpatrick, Cella, Harper & Scinto

[57] ABSTRACT

An ink-jet recording method is provided which employs inks of at least one color and a plurality of inks different in dye concentration for each color. The method is characterized in that the viscosities of the plurality of inks of the same color in the temperature range of 0° to 40° C. satisfy the relation $$V_{max.} - V_{min.} \leqq 1.0 \ (cps)$$

wherein, $V_{max.}$ and $V_{min.}$ represent the maximum and minimum values, respectively, of these viscosities.

8 Claims, 6 Drawing Figures

INK-JET RECORDING METHOD

BACKGROUND OF THE INVENTION

1. Field of the Invention

The present invention relates to an ink-jet recording method for color images which comprises shooting droplets of inks (recording liquids) and causing them to adhere to a recording medium to form a color image thereupon. More particularly, this invention relates to an ink-jet recording method suitable for reproducing full-color images with a wide variety of colors and with satisfactory density gradation by using inks of different dye concentrations.

2. Description of the Prior Art

The ink-jet recording method is a recording process which comprises ejecting ink droplets through nozzles by a discharge technique such as a technique utilizing electrostatic attraction by applying high voltage, a technique of giving mechanical vibration or displacement to the ink by using piezoelectric elements, and a technique of heating and foaming the ink instantaneously to utilize the foaming pressure, and causing ejected ink droplets to adhere onto a recording medium such as paper. This method is noticed as a recording process which generates less noises and permits high speed recording.

For recording, by means of ink jet recording methods, of color images delicate in shade like those obtained by silver salt photography, density gradation of colors in images have been reproduced so far by using inks of colors, e.g. cyan, magenta, yellow, and black, and controlling the diameter and number (per unit area) of ink dots marked with these inks to mix colors corresponding to the densities of the three primary color components in original images.

However, this recording technique of varying the diameter and number of ink dots cannot reproduce such gradation of original images as to vary continuously and smoothly over the entire area of from low to high image densities, but gives low resolution images or unnatural images.

Various ink-jet recording techniques have been proposed to solve the above problems. Among these techniques, those employing two inks different in dye concentration for each one color are disclosed in Japanese Laid-open patent application No. 156264/1982 and other documents.

In ink-jet recording technique of the above patent application is characterized in that a plurality of inks different in dye concentration are used for each color, the diameter and number of ink dots are varied according to local densities on the original image, and dots of the ink of lower dye concentration of each color are marked on all the picture elements of that color. With this technique, density gradations particularly in low image density areas can be better reproduced for each color of an image than with conventional ink-jet recording techniques.

According to this recording technique, however, physical properties such as viscosity, surface tension, and pH of the plurality of inks of each color vary from ink to ink since the inks of each color are prepared by dissolving a dye at different concentrations in the solvents consisting of the same composition. In particular, the viscosity variations among the inks will cause variations in the diameter of ink dots (under the same ink droplet discharge conditions) and deviations of falling points of ink droplets from the respective targets on recording media. These problems are significant objections to recording good quality images of high resolution and of natural feeling.

On the other hand, ink-jet recorders are required to be capable of furnishing good quality records over a temperature range as wide as possible, since ink-jet recorders are used not necessarily at a definite temperature but at various temperatures. Similar capability is needed for the inks to be used therein, that is, the inks are required to cope sufficiently with the difference between their preparation and service temperatures or with the variation of environmental temperature during service and to secure constantly good recording performance characteristics and storage stability.

Service temperature of inks are generally different from the preparation temperature thereof. Hence, inks of the same color, if different in the temperature dependence of viscosity, will also differ in viscosity at service temperatures which considerably depart from the preparation temperature, even though the inks have been prepared at a definite temperature so as to be given the same viscosity. This will deteriorate the resulting image quality as stated above.

SUMMARY OF THE INVENTION

The present invention has been made to solve the above noted problems.

Accordingly, an object of the invention is to provide an ink-jet recording method which permits reproducing high quality color images by using a plurality of inks different in dye concentration for each color.

Another object of the invention is to provide an ink-jet recording method which permits reproducing such a color image with high fidelity that density gradation varies continuously and smoothly from point to point on the image over a wide variety of image densities.

A particular object of the invention is to provide an ink-jet recording method which permits reproducing high quality images by using a plurality of inks different in dye concentration for each color, wherein the diameters of ink dots of the same color are equal under the same discharge conditions and the falling points of ink droplets of the same color do not deviate from the respective proper points, without being affected by the different dye concentrations.

According to one aspect of the present invention, there is provided an ink-jet recording method employing inks of at least one color and a plurality of inks containing different concentrations of dye for each color, characterized in that the viscosities of the plurality of inks of the same color in the temperature range of 0° to 40° C. satisfy the relation $$V_{max.} - V_{min.} \leqq 1.0 \text{ (cps)}$$

wherein, $V_{max.}$ and $V_{min.}$ represent the maximum and minimum values, respectively, of the viscosities.

According to another object of the present invention, there is provided a color recording method with ink-jets employing a plurality of inks of different colors and a plurality of inks containing different concentrations of dye for each color, characterized in that the viscosities of the plural inks of the same color in the temperature range of 0° to 40° C. satisfy the relation $$V_{max.} - V_{min.} \leqq 1.0 \text{ (cps)}$$

wherein, $V_{max.}$ and $V_{min.}$ represent the maximum and minimum values, respectively, of these viscosities.

DESCRIPTION OF THE PREFERRED EMBODIMENTS

Figure 1:
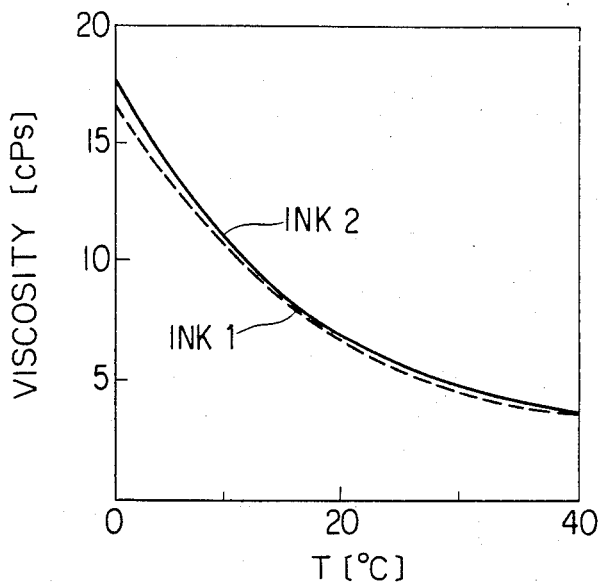
FIGS. 1-6 are graphs showing the temperature dependencies of the viscosities at temperatures of 0°-40° C. of the inks prepared in examples of the invention and comparative examples.

In the method of the invention, inks of a desired color are employed for single-color recording and inks of 3-4 different colors (e.g., cyan, magenta, yellow, and black) are usually employed for multicolor recording and the diameter and number of ink dots of each color are controlled for mixing colors according to hues on original images.

The inks used in the method of the invention are each composed of a dye as a recording agent component and a medium comprising water and water-miscible solvents.

Dyes generally used for ink-jet recording inks can also be used as recording agent components of the inks. In the method of the invention, a plurality of inks different in dye concentration are used for each color to reproduce density gradation which varies continuously and smoothly over a wide density range. These plural inks can be prepared by varying concentrations of dyes, and for each color preferably by using one dye in different concentrations. This is for the purpose of preventing the deviation of hue which, if two or more dyes of the same color are used, would be caused by the different dyes and additionally would become remarkable with the lapse of time on account of the difference in light fastness among the dyes used. Concentrations of a dye in the inks are generally in the range of 0.1 to 4.0%, preferably on the levels of 0.3-0.5%, 0.7%, and 2.0-3.0%, by weight.

The viscosity of each ink used in the invention and the temperature dependence of the viscosity can be adjusted chiefly by varying the proportion of a water-miscible solvent in the ink or adding one or more viscosity regulators such as poly(vinyl alcohol), cellulosic resins, and some other water-soluble resin in suitable amounts to the ink. These methods can also be combined for the adjustment.

Viscosities of inks for each color are adjusted within a desired definite range by the above method. This desired definite range means such a viscosity range of the inks that no substantial variation due to the difference of dye concentration will be observed in diameters of ink dots marked under the same discharge conditions. This viscosity range is represented by the relation $$V_{max.} - V_{min.} \leq 1.0 \text{ (cps)}$$

wherein $V_{max.}$ and $V_{min.}$ represent the maximum and minimum values, respectively, of the viscosities of the same color inks different in dye concentration. Moreover, the temperature dependence of viscosities of these inks is regulated by the above method so that these viscosities may satisfy the above relation at any temperature in the range of 0° to 40° C. which are possible temperatures of operating ink-jet recorders. Without such adjustment of the temperature dependence of the viscosities, viscosities of some of the inks will depart from the above range, for instance, at low temperatures, as shown later in comparative examples, even if viscosities of all the inks of the same color are adjusted within the above range at ordinary temperature (25° C.); the difference between $V_{max.}$ and $V_{min.}$ at 0° C. becomes about 2.8 cps at its maximum. In such cases, there are observed again variations among inks in diameters of ink dots marked under the same discharge conditions and moreover deviations of falling points of ink droplets on recording media from the respective target points.

The water-miscible solvent for regulating the viscosity of each ink by varying the proportion thereof in the ink acts as a solvent component for dissolving the dye and additionally as a wetting agent for preventing the clogging ink-discharging orifices. Suitable examples of the water-miscible solvent are; $C_1$-$C_4$ alkyl alcohols such as methanol, ethanol, n-propanol, isopropanol, n-butanol, secbutanol, tert-butanol, and isobutanol; amides such as dimethylformamide and dimethyl-acetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidinone; polyalkylene glycols such as polyethylene glycol and polypropylene glycol; alkylene glycols containing $C_2$-$C_6$ alkylene, such as ethylene glycol, propylene glycol, butylene glycol, triethylene glycol, 1,2,6-hexane-triol, thiodiglycol, hexylene glycol, and diethylene glycol; glycerol; and lower alkyl ethers of polyhydric alcohols such as ethylene glycol methyl ether, diethylene glycol methyl (or ethyl) ether, and triethylene glycol monomethyl (or monoethyl) ether.

Of these water-miscible solvents, preferred are diethylene glycol, triethylene glycol monomethyl ether, and triethylene glycol monoethyl ether.

The contents of the water-miscible solvent in the inks are in the range of generally 5 to 95%, preferably 10 to 80%, and more preferably 20 to 50%, by weight based on the total weight of each ink. For adjusting viscosities of the inks, the contents of the water-miscible solvent therein may or may not be the same in the same concentration level of inks.

Materials which can be used effectively as the viscosity regulator as well as the water-miscible solvent include, for example, 2-pyrrolidones, polyalkylene glycols, monoethers of polyalkylene glycols, and polyoxyethylene alkylphenyl ethers.

The inks thus prepared for use in the invention are excellent and well balanced, as such, in recording performance characteristics (signal responsiveness, droplet formation stability, discharge stability, long-hour continuous recording performance, and discharge stability after a long rest), storage stability, solution stability of dye, fixability on recording media, and light fastness, weather resistance, water resistance, and alcohol resistance of resulting images.

Various additives such as a surfactant, pH conditioner, resistivity regulators, etc. may be incorporated into the inks if necessary for further improvements of some of the above characteristics, such as recording performance characteristics, storage stability, and fixability on recording media.

According to the ink-jet recording method of the invention wherein the thus prepared inks are used, it has become possible to carry out recording without causing any substantial variation in diameters of ink dots or any substantial deviation of falling points of ink droplets over a wide range of recording temperatures, particularly at low temperatures, since the viscosities of inks of the same color different in dye concentration and the temperature dependencies of these viscosities are adjusted to be within a sufficiently narrow range.

Moreover, density gradation varying continuously and smoothly over a wide range of image densities can well reproduced since the inks of the same color cover a wide variety of dye concentrations. In particular, when images delicate in shade are reproduced by using inks of two or more colors, natural high quality iamges can be obtained according to the method of the invention.

The invention is illustrated in more detail with reference to the following examples and comparative examples.

EXAMPLE 1

Two inks (ink 1 and ink 2) of the same color different in dye concentration were prepared in the following way:

The component materials for links, including C.I. Direct Yellow 86 as dye, were mixed with stirring to form the compositions shown in Table 1, until the dye was dissolved almost completely. Each mixture was passed through a filter of $1.0\mu$ in pore size (supplied by Sumitomo Denko Co., Ltd. under the tradename of Fluoropore Filter) with pressure. The filtrates were used as inks.

TABLE 1

| Component of ink | | Concentration (wt %) of component | |
|---|---|---|---|
| | | ink 1 | ink 2 |
| Dye: | C.I. Direct Yellow 86 | 0.7 | 3.0 |
| Solvent: | Water | 49.3 | 47.0 |
| | Triethylene glycol | 15.0 | 15.0 |
| | Polyethylene glycol #300* | 15.0 | 15.0 |
| | 1,3-Dimethyl-2-imidazolidinone | 20.0 | 25.0 |

*"#300" means an approximate average molecular weight of 300.

Viscosities of the inks and temperature dependencies of the viscosities were regulated by varying the concentration of 1,3-Dimethyl-2-imidazolidinone as shown in Table 1.

Then, viscosities of these inks were measured by using an E-type of rotational viscometer with the sample temperature being varied continuously from 0° to 40° C. The results were as shown in FIG. 1.

As is apparent from FIG. 1, changes of the viscosities of the inks 1 and 2 with temperature were nearly identical and the viscosity difference between the two inks was 0.6 cp or less at any temperature within the range where the viscosities were measured, that is, the viscosities were sufficiently close to each other.

Then, ink-jet recording tests with these inks were conducted under the following conditions:

| Orifice diameter: | 65 μm |
|---|---|
| Width of applied pulses: | 10 μs |
| Applied voltage: | 50 V |
| Recording medium: | Mitsubishi ink-jet recording paper (supplied by Mitsubishi Paper Mills, Ltd.) |
| Recording temperatures: | 0-40° C. |

An any temperature of the tests, the diameters of the ink dots marked with these inks were almost equal and falling points of droplets of these inks shot to the same target on the recording paper were in close agreement with one another.

COMPARATIVE EXAMPLE 1

The same dye as used in Example 1 was dissolved in two portions of a solvent mixture of the following composition to concentrations of 3.0 wt % and 0.7 wt %. Therefrom two inks (ink 3 and ink 4) of the following compositions different in dye concentration were prepared in accordance with the procedure of Example 1.

Composition of solvent:

| Water | 50.0 parts by weight |
|---|---|
| Triethylene glycol | 15.0 parts by weight |
| 1,3-Dimethyl-2-imidazolidinone | 20.0 parts by weight |
| Polyethylene glycol #300 | 15.0 parts by weight |

Compositions of inks (yellow inks):

| Ink 3, C.I. Direct yellow 86 | 0.7 part by weight |
|---|---|
| Solvent | 99.3 parts by weight |
| Ink 4, C.I. Direct Yellow 86 | 3.0 parts by weight |
| Solvent | 97.0 parts by weight |

Thus, the inks in this comparative example were prepared by using the same composition of solvent mixture and varying the dye concentration only.

Viscosities of these two inks were measured at temperatures of 0°–40° C. in the same manner as in Example 1.

Figure 2:
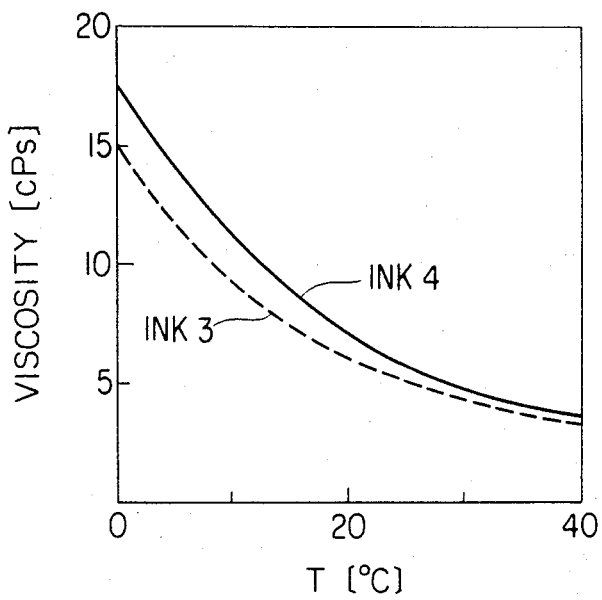

Results thereof are shown in FIG. 2. As is apparent therefrom, the viscosities of the two inks agreed with each other within 1.0 cp at temperatures around 25° C., but the viscosity difference between the inks at temperatures below about 20° C. increased with decrease in temperature and became as large as 2.5 cps at about 5° C.

Ink-jet recording tests of these two inks were conducted in the same manner as in Example 1. At temperatures lower than about 20° C., considerable difference was observed between these two inks in diameters of ink dots marked and in falling points of ink droplets shooted to the same target on the recording paper.

EXAMPLE 2

Using C.I. Acid Red 37 as dye, two inks (ink 5 and ink 6) of the same color and of different dye concentrations having the compositions shown in Table 2 were prepared in accordance with the procedure of Example 1.

TABLE 2

| Component of ink | | Concentration (wt %) of component | |
|---|---|---|---|
| | | ink 5 | ink 6 |
| Dye: | C.I. Acid Red 37 | 0.7 | 3.0 |
| Solvent: | Water | 49.3 | 47.0 |
| | Glycerol | 15.0 | 10.0 |
| | Triethylene glycol | 15.0 | 20.0 |
| | N—methyl-2-pyrrolidone | 20.0 | 20.0 |

The viscosities of these inks and temperature dependencies of the viscosities were regulated by varying the concentration of triethylene glycol, which also acts as a viscosity regulator, according to the dye concentrations.

The viscosities of the two inks were measured at temperatures of 0°–40° C. in the same manner as in Example 1.

Figure 3:
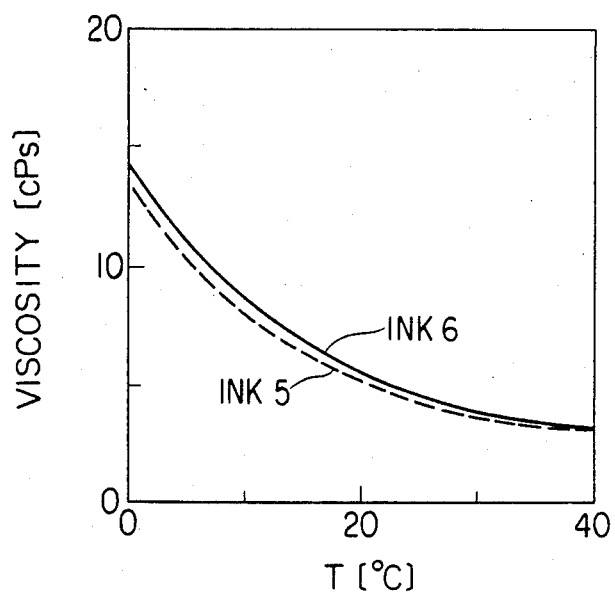

The results thereof are shown in FIG. 3. As is apparent therefrom, the temperature dependencies of viscosities of inks 5 and 6 were nearly identical and the viscosity difference between the two inks was 0.6 cp or less at any temperature within the range where the viscosities were measured.

Ink-jet recording tests of these inks were conducted in the same manner as in Example 1. At any temperature of the tests, close agreement was observed between these two inks in diameters of ink dots marked as well as in falling points of ink droplets shot to the same target on the recording paper.

COMPARATIVE EXAMPLE 2

The same dye as used in Example 2 was dissolved in two portions of a solvent mixture of the following composition to the concentrations of 3.0 wt % and 0.7 wt %. Therefrom two inks (ink 7 and ink 8) of the following compositions different in dye concentration were prepared in accordance with the procedure of Example 1.

Composition of solvent:

| Water | 50 parts by weight |
| --- | --- |
| Triethylene glycol | 15.0 parts by weight |
| Glycerol | 15.0 parts by weight |
| N—Methyl-2-pyrrolidone | 20.0 parts by weight |

Compositions of inks (magenta inks):

| Ink 7, C.I. Acid Red 37 | 0.7 part by weight |
| --- | --- |
| Solvent | 99.3 parts by weight |
| Ink 8, C.I. Acid Red 37 | 3.0 parts by weight |
| Solvent | 97.0 parts by weight |

Thus, these inks were prepared using the same composition of solvent mixture and varying the dye concentration.

Viscosities of these two inks were measured at temperatures of 0°–40° C. in the same manner as in Example 1.

Figure 4:
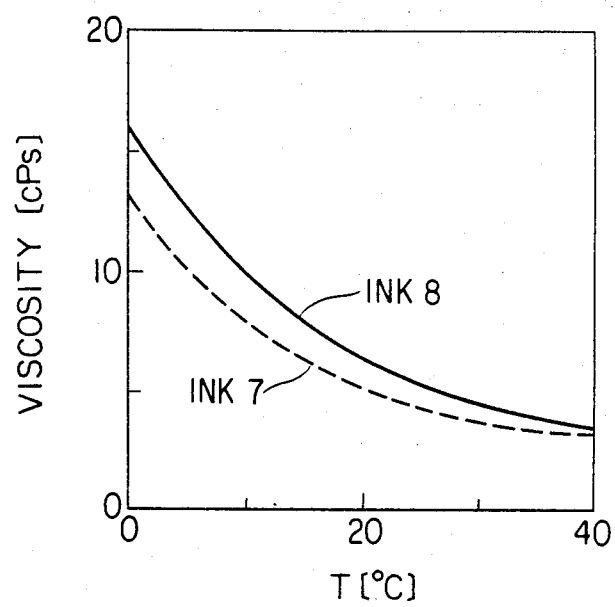

The results thereof are shown in FIG. 4. As it apparent therefrom, the viscosities of the two inks were in agreement with each other within 1.0 cp at ordinary temperature but differed by about 1.0– about 2.8 cps at low temperatures of 15° C. and below.

Ink-jet recording tests of these two inks were conducted in the same manner as in Example 1. At temperatures lower than about 19° C., considerable difference was observed between the two inks in diameters of ink dots marked and in falling points of ink droplets shot to the same target on the recording paper.

EXAMPLE 3

Using C.I. Direct Blue 86 as dye, two inks (ink 9 and ink 10) of the same color and of different dye concentrations having the compositions shown in Table 3 were prepared in accordance with the procedure of Example 1.

TABLE 3

| Component of ink | | Concentration (wt %) of component | |
| --- | --- | --- | --- |
| | | ink 9 | ink 10 |
| Dye: | C.I. Direct Blue 86 | 0.7 | 3.0 |
| Solvent: | Water | 49.3 | 47.0 |
| | Glycerol | 20.0 | 17.0 |
| | Polyethylene glycol #300 | 10.0 | 13.0 |
| | N—Methyl-2-pyrrolidone | 20.0 | 25.0 |

Viscosities of the inks and the temperature dependencies of the viscosities were regulated by varying chiefly the concentration of glycerol, which also acts as a viscosity regulator, according to the dye concentrations.

Viscosities of these two inks were measured at temperatures of 0°–40° C. in the same manner as in Example 1.

Figure 5:
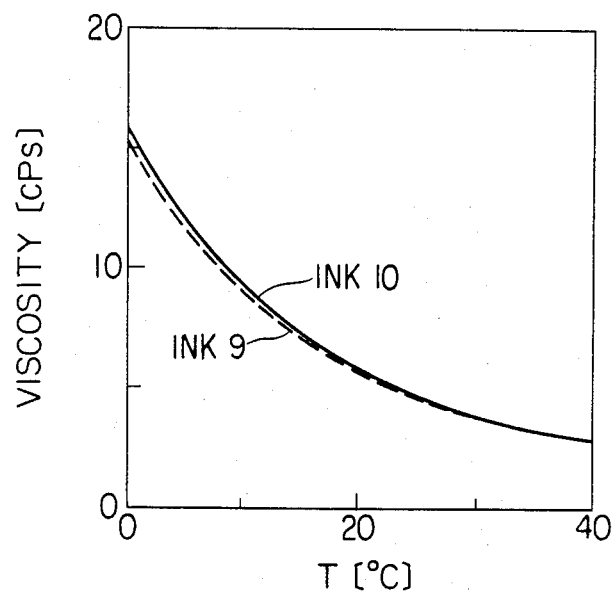

The results thereof are shown in FIG. 5. As is apparent therefrom, the temperature dependencies of viscosities of inks 9 and 10 were nearly identical and the viscosity difference between the two inks was 0.4 cp or less at any temperature within the range where the viscosities were measured.

Ink-jet recording tests of these inks were conducted in the same manner as in Example 1. An any of the test temperatures, close agreement was observed between these two inks in diameters of ink dots marked and in falling points of ink droplets shot to the same target on the recording paper.

COMPARATIVE EXAMPLE 3

The same dye as used in Example 3 was dissolved in two portions of a solvent mixture of the following composition to concentrations of 3.0 wt % and 0.7 wt %. Therefrom two inks (ink 11 and ink 12) of the following compositions different in dye concentration were prepared in accordance with the procedure of Example 1.

Composition of solvent:

| Water | 50.0 parts by weight |
| --- | --- |
| Glycerol | 20.0 parts by weight |
| Polyethylene glycol #300 | 10.0 parts by weight |
| N—Methyl-2-pyrrolidone | 20.0 parts by weight |

Compositions of inks (blue inks):

| Ink 11, C.I. Direct Blue 86 | 0.7 part by weight |
| --- | --- |
| Solvent | 99.3 parts by weight |
| Ink 12, C.I. Direct Blue 86 | 3.0 parts by weight |
| Solvent | 97.0 parts by weight |

Thus, these inks were prepared using the same composition of solvent and varying the dye concentration.

Figure 6:
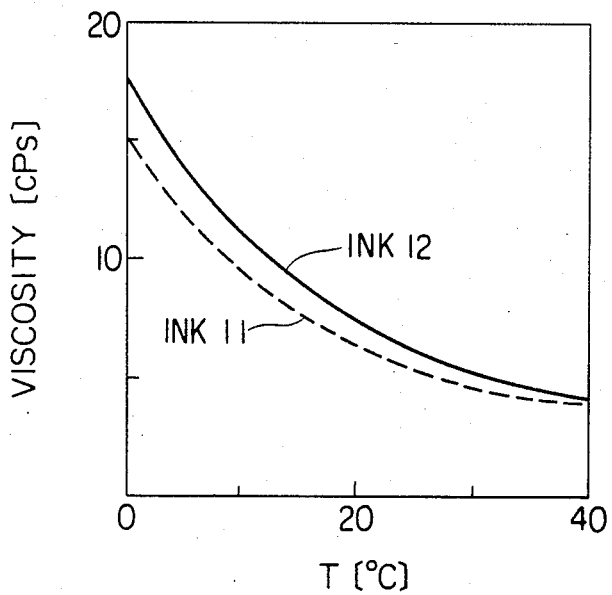

The results thereof are shown in FIG. 6. As is apparent therefrom, viscosities of the two inks were in agreement with each other within 1.0 cp limit at ordinary temperature (about 25° C.) but differed by about 1.0— about 2.2 cps at low temperatures of 20° C. and below.

Ink-jet recording tests for these two inks were conducted in the same manner as in Example 1. At temperatures lower than about 19.5° C., considerable difference was observed between these two inks in diameters of ink dots marked and in falling points of ink droplets shot to the same target on the recording paper.

What I claim is:

1. An ink-jet recording method employing inks of at least one color and a plurality of inks containing different concentration of a dye for each color, characterized in that the viscosities of the plurality of inks of the same color in the temperature range of 0° to 40° C. satisfy the relation $$V_{max.} - V_{min.} \leqq 1.0 \text{ (cps)}$$

wherein, $V_{max.}$ and $V_{min.}$ represent the maximum and minimum values, respectively, of the viscosities.

2. The ink-jet recording method of claim 1, wherein the inks are water-base inks.

3. The ink-jet recording method of claim 1, wherein each of the inks comprises a solution of water-soluble dye in a water base solvent.

4. The ink-jet recording method of claim 1, wherein each of the inks contains a viscosity regulator.

5. A color recording method with ink-jet employing plural inks of different colors and plural inks containing different concentrations of dye for each color, characterized in that the viscosities of the plural inks of the same color in the temperature range of 0° to 40° C. satisfy the relation $$V_{max.} - V_{min.} \leqq 1.0 \text{ (cps)}$$

wherein, $V_{max.}$ and $V_{min.}$ represent the maximum and minimum values, respectively, of these viscosities.

6. The color recording method with ink-jets of claim 5, wherein the inks are water base inks.

7. The color recording method with ink-jets of claim 5, wherein each ink consists of a solution of water-soluble dye in a water base solvent mixture.

8. The color recording method with ink-jets of claim 5, wherein each ink contains a viscosity regulator.

* * * * *